M. LACHMAN.
WIRE WHEEL.
APPLICATION FILED FEB. 8, 1918.
1,432,191.
Patented Oct. 17, 1922.
2 SHEETS—SHEET 2.
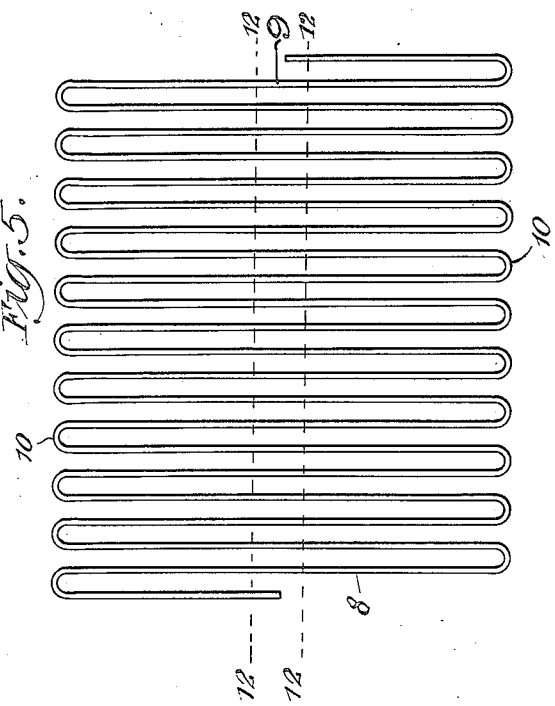
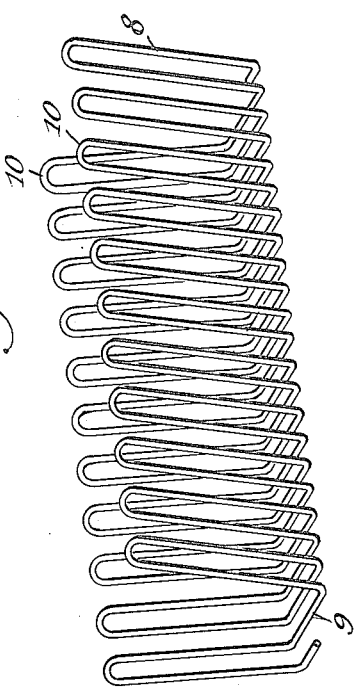
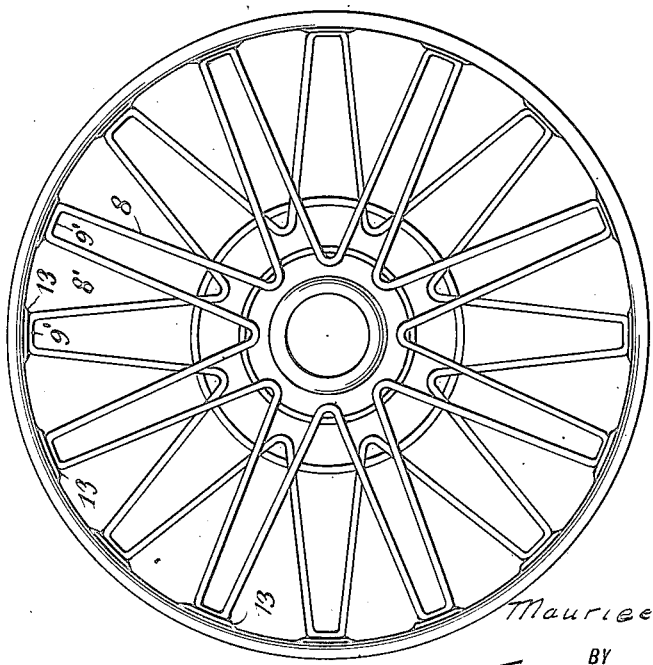
INVENTOR
Maurice Lachman
BY
ATTORNEYS Patented Oct. 17, 1922.

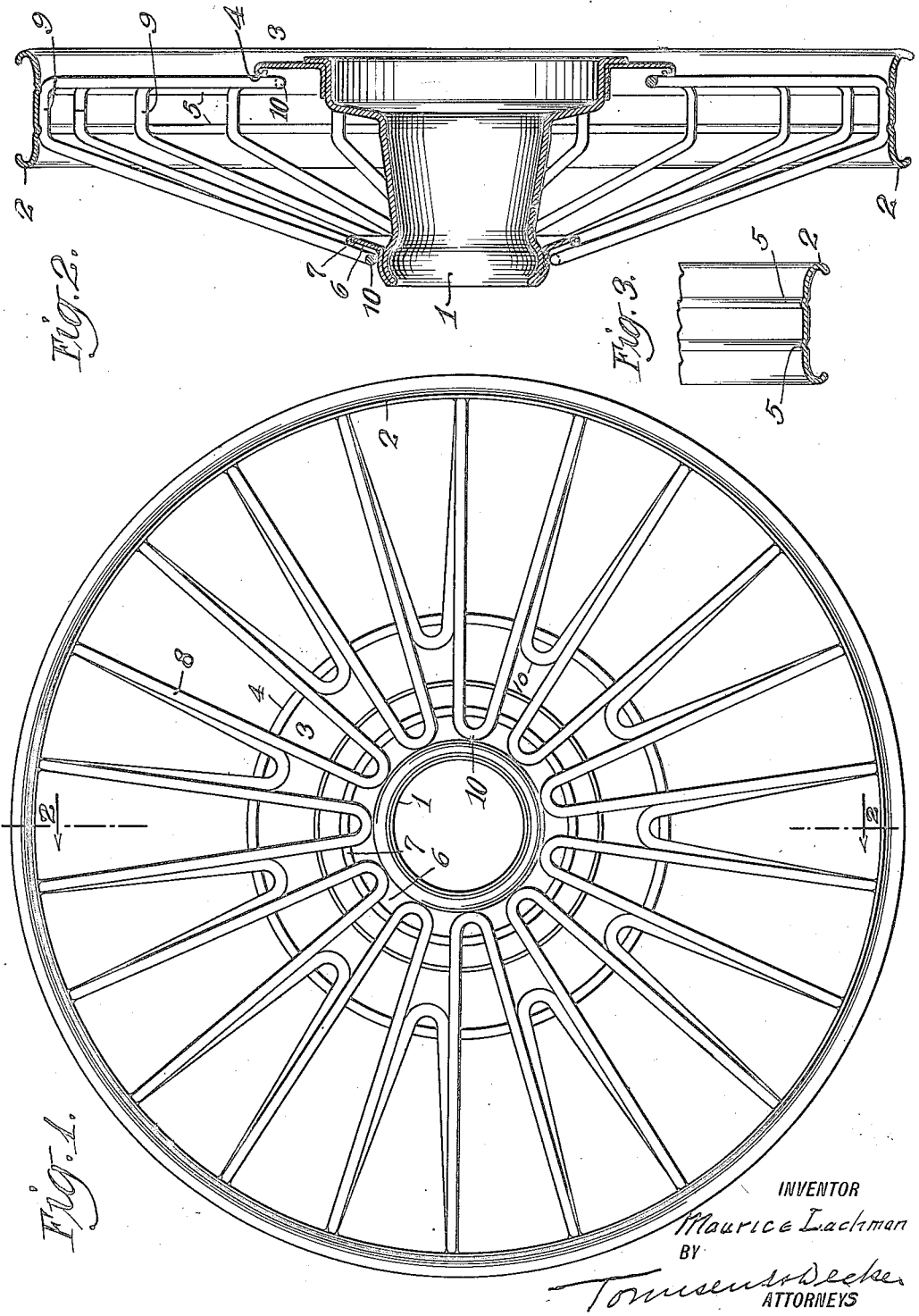

1,432,191

UNITED STATES PATENT OFFICE.

MAURICE LACHMAN, OF NEW YORK, N. Y., ASSIGNOR, BY MESNE ASSIGNMENTS, TO BETHLEHEM STEEL COMPANY, OF BETHLEHEM, PENNSYLVANIA, A CORPORATION OF PENNSYLVANIA.

WIRE WHEEL.

Application filed February 8, 1918. Serial No. 215,981.

*To all whom it may concern:*

Be it known that I, MAURICE LACHMAN, a citizen of the United States, and a resident of New York, in the county of New York and State of New York, have invented certain new and useful Improvements in Wire Wheels, of which the following is a specification.

My invention relates to metallic wheels and more particularly to wheels of the class in which the spokes consist of wire. In wheels of this class as usually constructed the spoke lengths are fastened in the rim by nuts and at the hub ends of the spoke lengths they are secured or connected by hooking the wire to the hub or by other mechanical device.

The object of my present invention is to improve and cheapen the construction of wheels having wire spokes by so forming the same that the fastening to the rim and hub will be a permanent welded fastening and the hub and also the rim will be free of perforations or breaks tending to weaken the construction and adding to the difficulty and cost of manufacture.

A further object of the invention is to permit the spoke portion of the wheel to be made of continuous lengths of wire instead of from individual radial wire legs of sufficient length to embrace the radial distance between hub and rim.

Another object of my invention is to so construct the wheel that it may be readily manufactured by employing the electric welding process for fastening the spokes to rim and hub.

To these ends my invention consists in the novel features of construction of wire wheel hereinafter described and shown in the accompanying drawings and more particularly specified in the claims.

In the drawings:

Fig. 1 is a side elevation of a form of wire wheel embodying my invention.

Fig. 2 is a vertical cross-section through the same.

Fig. 3 shows a portion of the inside of the metal rim suitably prepared for securing the spoke lengths to the rim by electric welding.

Fig. 4 is a side elevation of a modified construction of wire wheel embodying my invention.

Figs. 5 and 6 illustrate one of the ways in which the continuous length of wire may be formed up into shape suitable for constructing a wheel of the form shown in Figs. 1 and 2.

1 indicates the metal shell or barrel of the hub of the wheel. The interior parts and bearings usually employed are omitted from the drawings for the sake of simplicity as they form no part of the present invention. 2 indicates the usual form of metallic rim. 3 indicates a flange at the inner end of the hub. Said flange may be formed integral with the barrel 1 but preferably consists of a separate piece fastened thereto in any desired manner. Said flange is provided, as indicated at 4, with a rounded projection formed in any desired manner as for instance by rounding the turned-over outer edge of said flange. Said projection extends preferably as a continuous circumferential projection on the flange and is provided either on the outer or inner face thereof as may be desired. Said projection is employed to facilitate the operation of welding the wire spoke portion of the wheel by a side weld of the wire when the welding is done by the electric process. I do not limit myself, however, to any particular manner of preparing the flange on the hub or providing it with a projection for welding purposes.

The inner periphery of the rim is provided with projection as indicated at 5 to facilitate the welding of the wire spokes by a side welding of a loop or bend at the outer end of the spoke lengths when the union is effected by electric welding. These projections 5 may be formed by indenting the rim from the outside periphery to cause a projection upon the inner side of the metal rim and, as will be seen, the projections thus formed are integral throughout with the rim and do not leave any perforations or breaks in the structure of the metal. I do not limit myself however, to this particular manner of preparing the inner periphery of the rim for electric welding. It is preferable, however, to use projections 5 extending around the whole inner circumference of the rim as shown since, with such formation, it becomes unnecessary to locate the outer ends of the spokes in any particular position with respect to the circumference of the rim during the process of manufacture. It is preferable for purposes of strength to employ a pair of projections 5 which are bridged by the loop at the outer end of the spoke ends, which loop extends across and is welded to both projections in the form of the invention illustrated in Figs. 1 and 6.

At the outer end of the hub is provided a flange 6 which may be integral with the hub barrel 1 or may be a separate piece secured thereon. Said flange 6 when employed is likewise suitably formed, by preference, with projections adapted to facilitate the welding of the wire spokes by a side weld between the side of the wire and the side of the flange. This welding projection may be afforded by a circumferential projection 7 on said flange similar to the projection 4 on the flange 3 but other methods of forming the flange to facilitate electrical welding might be employed.

Each length of wire spoke 8 is extended into a bend 9 at its outer end, the bend or elbow being preferably disposed transverse to the rim, as shown, and the union of the rim and spoke end being effected through the welding of the outer edge of said loop or bend 9 directly to the inner edge of the integral projection extending radially inward from the inside of the rim. Each spoke length also at the hub end thereof is extended into a loop or bend 10, the plane of said loop being preferably, as shown, parallel to the plane of the hub flange. Said loops or bends 9, 10 connect contiguous spokes as shown, and in the preferred form of my invention the whole spoke portion of the wheel is formed of a continuous length of wire made up of spoke lengths 8 and loops or bends 9 and 10. As however shown in Fig. 4, the spoke portion of the wheel may be subdivided into sections each comprising continuous lengths of wire. At the hub ends of the spokes the loop or bend 10 preferably seats on the outer periphery of the hub at the outer end thereof. Similarly the loops or bends 10 at the inner end of the hub may seat upon the outer periphery of the barrel or hub shell 1, this seating being employed in each instance to secure greater rigidity and strength although in some cases, for instance where the wheel does not have to withstand great crushing effect, it may not be found necessary.

The whole spoke portion of the wheel may be formed up into the shape shown in any desired way. One of the ways in which this may be done and which forms the subject of claims in a co-pending application filed by me February 8th 1918, S. N. 215,982 is illustrated in Figs. 5 and 6. According to this method a suitable length of wire is taken and formed up in zigzag manner in one plane to produce the bends or loops 10 and spokes 8 and the skeleton thus formed is then bent up on the lines 12 to form, as indicated in Fig. 6, the bends 9. After this has been done the wire skeleton shown in Fig. 6 is spread out into the shape which it must take in the finished wheel to form a spoke portion thereof when the wheel is constructed with a spoke portion in the shape shown in Figs. 1 and 2.

In the modification illustrated in Fig. 4 the wire portion of the wheel is formed in two sections or divisions 8, 8', the one portion 8 being welded to the outer end of the hub while the portion 8' is welded to the inner end of the hub. Each section or portion is provided with the loops or bends 9' but these are disposed in a plane parallel with the rim, as shown. These may be electrically welded to the inner side of the rim by spaced projections 13 provided thereon or may be welded to said rim by any other suitable means or method.

What I claim as my invention is:—

1. A metal wheel having wire spokes side welded at their inner ends to the hub and connected with contiguous spokes by bends or loops formed in a plane parallel to the plane of the wheel and welded at their outer ends to projections extending radially inward from the unbroken surface of the inside of the rim on the extreme outer edge of bends extending transversely to the rim.

2. A wire wheel comprising essentially three parts, to wit a metal rim indented to form projections on the inner surface of the rim integral throughout with the material thereof, a hub barrel provided with a flange having a sidewise projection at each end of the barrel and a continuous length of bent wire bent into loops at the inner and outer ends of the spoke lengths and welded by the edge of the wire to the projections on the hub and to the projections on the inner surface of the rim to form a complete wheel having no breaks in the rim.

3. A wire wheel the spoke portion of which consists of a continuous length of wire formed with loops or bends at the inner and outer ends of the spoke lengths, the bends at the inner ends being parallel to the plane of the wheel and the bends at the outer ends being transverse thereto and being welded to the inside of the metal rim.

4. A wire wheel having a spoke portion formed of a continuous length of wire provided with loops or bends connecting contiguous spoke lengths at the outer and inner ends of said spokes, the bends at the inner and outer ends being disposed transversely to one another, said spoke lengths being side welded to the hub at the inner and outer ends thereof and the bends at the outer ends of the spoke lengths being side welded to the inside of the rim.

5. A wire wheel the spoke portion of which comprises a continuous length of wire bent into loops or bends connecting spoke lengths at their outer ends and welded to projections extending radially inward from the unbroken inner surface of the rim and having other bends or loops connecting contiguous spoke lengths at their inner ends, said wire being welded to the hub at said inner ends.

Signed at New York, in the county of New York and State of New York, this 7th day of February A. D. 1918.

MAURICE LACHMAN.

Witnesses:
F. B. TOWNSEND,
IRENE LEFKOWITZ.